| United States Patent [19] | [11] Patent Number: 4,684,687 |
| Breach et al. | [45] Date of Patent: Aug. 4, 1987 |

[54] CHEMICAL AND HEAT RESISTANT RUBBER COMPOSITION

[75] Inventors: William D. Breach, Humble; Edwin W. Vaclavik, Houston, both of Tex.

[73] Assignee: Hydril Company, Houston, Tex.

[21] Appl. No.: 808,528

[22] Filed: Dec. 13, 1985

Related U.S. Application Data

[63] Continuation-in-part of Ser. No. 709,514, Mar. 7, 1985, Pat. No. 4,575,522.

[51] Int. Cl.$^4$ ............................ C08K 3/04; C08K 5/13
[52] U.S. Cl. .................................... 524/291; 523/220; 524/496; 524/530; 524/581
[58] Field of Search ............... 523/220; 524/581, 496, 524/530, 291

[56] References Cited

U.S. PATENT DOCUMENTS 4,125,509 11/1978 Yostovich ........................... 524/291
4,180,531 12/1979 Alia ..................................... 525/214
4,201,834 5/1980 Hannon et al. ..................... 524/291
4,419,475 12/1983 Vostovich ........................... 524/264
4,575,522 3/1986 Breach et al. ....................... 523/220

*Primary Examiner*—Herbert J. Lilling
*Attorney, Agent, or Firm*—Vaden, Eickenroht, Thompson & Boulware

[57] ABSTRACT

A composition for use in piping and pump systems for elevated temperature, steam and certain chemical resistant applications of ethylene-propylene copolymer with peroxide generated carbon to carbon crosslinkage. Effective amounts of antioxidants, carbon black, lubricant, thermal stabilizer and aid to peroxide crosslinkage is added. An antioxidant and thermal stabilizer system is used to produce a product with unusual thermal stability characteristics. The composition may also have a mixture of high and low particle size carbon black which acts as an antioxidant and reinforcing system. The composition may also use very fine particle carbon black for a highly elastic application. The composition can be used for rubber components which are exposed to a high temperature or to certain chemical environments, or where unusually high elasticity is required.

13 Claims, 2 Drawing Figures

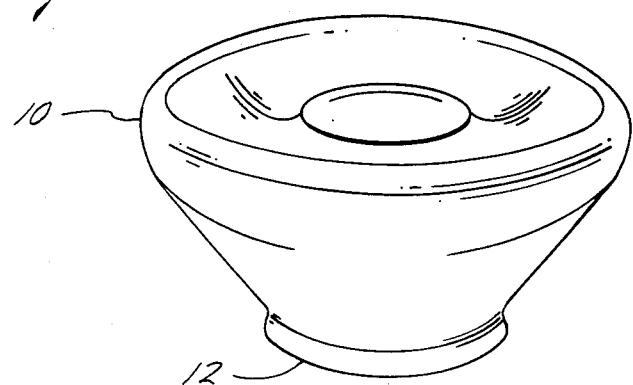
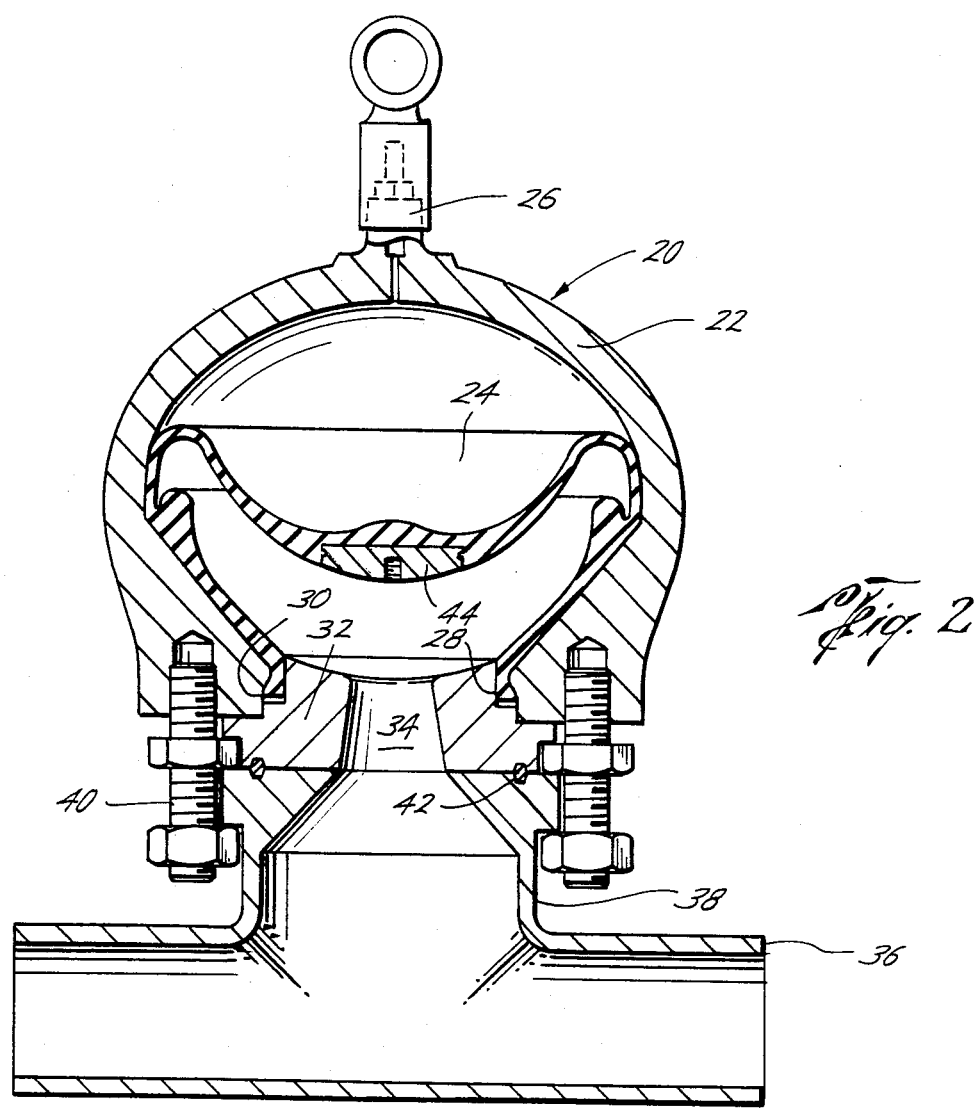

CHEMICAL AND HEAT RESISTANT RUBBER COMPOSITION

BACKGROUND AND SUMMARY OF THE INVENTION

This application is a continuation-in-part of U.S. Ser. No. 709,514 filed Mar. 7, 1985 now U.S. Pat. No. 4,575,522 for Rubber Composition for Geothermal Application.

This invention is for rubber parts of a pipeline, pumping system or other similar applications. The copolymer composition has an unusual and superior stability for use in an environment with elevated temperature, pressure and degradating chemicals. The composition is an ethylene-propylene copolymer which exhibits superior thermal and chemical resistant qualities. The copolymer can be prepared with variable viscosity by raising the ethylene percentage to increase viscosity and produce a harder rubber. The copolymer is crosslinked with carbon-carbon bonds between the polymer chains by using a peroxide to achieve the efficient crosslinkage. The type of carbon black added to the copolymer can be varied according to the elasticity required for the rubber part.

An antioxidant and thermal stabilizer system compatible with peroxide crosslinking is an important feature because the composition exhibits a synergistic protection from degradation of chemicals and elevated temperatures. The ingredients of this stabilizer system are a sterically hindered phenol, metal salts of dithiocarbamate and a coagent for crosslinking. The composition can also contain certain effective amounts of thermal stabilizers such as metallic oxides.

The carbon black used in the copolymer contributes to the reinforcement and toughening of the base polymer. However, the combination of a high particle size and a low particle size carbon black gives the thermal stability of the composition in a manner that is unusual and not attainable with a single grade of carbon black. The mixture of carbon blacks gives reinforcement typical of carbon blacks, but also antioxidant qualities attributed to the large particle size carbon black. Where high temperatures and steam are not a primary consideration, a single low particle size carbon black may be used alone to generate a composition with high elasticity which is desirable for parts such as accumulator diaphragms. The high elasticity is an unusual result for a peroxide cure.

The composition contains carbon to carbon crosslinkage between the copolymer chains generated by a peroxide curing agent. The copolymer has superior crosslinkage efficiency which gives a higher tensile strength and modulus. The composition can be made with a viscosity usable for transfer and compression molding of products.

Accumulators also known as pulsation dampeners are a type of vessel connected to a fluid flow line without interrupting the flow path. In some pipeline systems with positive displacement pumps, changes in fluid velocity during the pumping creates pulsations or "water hammer" which can cause severe vibration. The accumulator communicates with the flow line so that during a surge, it will fill with fluid which will be released after the surge for a smoother fluid flow. Severe surges occur when a line is shut quickly. Also, accumulators are used on hydraulic lines to store power fluid. The accumulators are sized for the application and have been made of many materials.

Certain of the accumulators have a metal housing which encloses a rubber diaphragm. The diaphragm expands and contracts within the housing as fluid from the flow line enters the accumulator. The rubber must be made of a composition which will maintain flexibility when exposed to the fluid. Many chemicals will degrade rubber particularly coupled with elevated temperatures and pressures. Of the more degrading chemicals are corrosion inhibitors which are added to pipelines. The inhibitors are often tertiary amines which embrittle polymers such as nitriles and fluoropolymers. The diaphragms as well as other rubber parts, such as seals, come into contact with the degradating chemicals.

There has been a need for rubber or polymer formulations for use in diaphragms and other rubber parts of pipelines and pumping systems subjected to degradating chemicals, temperatures and pressures. Various types of elastomers are used for the service depending on the fluid composition in the line. Natural and synthetic rubber has been stabilized by sulfur crosslinkage vulcanization. The polymer chains are crosslinked by one or more sulfur atoms bridging the chains. Under extreme conditions, sulfur vulcanized rubber tends to break down. The rubber becomes inelastic, brittle and does not perform adequately. The life of rubber parts can be only a few days in certain environments. With such a short effective life there is obviously high expense in replacing the rubber parts as well as down time and field personnel costs. A more stable rubber product has been sought to lengthen replacement time for rubber parts, as well as a rubber which has the resilience, tensile strength and resistance to abrasion for use in the diaphragm and other rubber parts.

Diaphragms and other rubber parts have been made of a number of types of elastomers including acrylonitrilebutadiene, natural rubber, butyl chlorobuytl rubber, fluoroelastomers and other known compositions. However, none of the typical elastomers functioned in lines subected to fluids with corrision inhibitors at elevated temperature. The need for a stable polymer led to the use of a composition manufactured by L'Garde, Inc. of Newport Beach, Calif. which had been originally developed for geothermal use. A typical formulation of the L'Garde composition includes a terpolymer of ethylene-propylenehexadiene markete under the trademark Nordel 1660 by DuPont Elastomer Division of Wilmington, Del. and a coagent polymer of 1-2 polybutadiene at 20 parts per 100 parts of the Nordel 1660 terpolymer. A dicumyl peroxide such as Dicup R, a trademark of Hercules, Inc. of Wilmington, Del., in 3.5 parts per 100 parts of rubber is used to effect carbon-carbon crosslinkage. However, the use of the terpolymer and polybutadiene produces a network of crosslinkage that includes a bond with a branch group on the polymer chain or linkage with the coagent which is not part of a uniform polymer chain. Also, the terpolymer used has a high diene content which promotes a faster cure and this usage is contrary to the accepted standards that a lower diene ages better. This type of crosslinkage is not as stable as a uniform crosslinkage between the backbones of the polymer chains without branch groups.

The L'Garde formulation also includes a halogenated hydrocarbon, chlorosulfonated polyethylene, under the trademark Hypalon 20, a DuPont product at 5 parts per hundred of the terpolymer and antimony oxide Thermoguard S a product of M&T Chemicals, Rahway, N.J., at 5 parts per hundred of terpolymer. Antioxidant 2246 (2,2'-methylene -bis(4-methyl-6-t-butyl phenol) an American Cyanamide product is used in a very low amount of 0.50 parts per hundred of terpolymer. The carbon black is an ASTM N100 type at 75 parts per hundred of the terpolymer.

The L'Garde composition has other drawbacks in addition to the lack of uniform crosslinking between carbon chains. The halogenated hydrocarbon is not recommended for usage in steam service much less geothermal service. The compound increases water absorption and may cause blistering in steam. The L'Garde formula contains a very low level of antioxidant which effectiveness is relative to the level in the rubber. The coagent, 1-2 butadiene, used by L'Garde causes the rubber to be hard and inelastic. This quality narrows the uses of the composition which require elasticity such as diaphragms in accumulators.

An improvement of the L'Garde Y267 for geothermal use was developed by Parker Seals of Culver City, Calif., Product No. E962-85. Although there is test data available, the compound formula E962-85 is not disclosed. From the test results Parker Seals finds the E962-85 superior to L'Garde Y267. However, after 168 hours in steam at 600° F., the compound lost 78% of its tensile strength.

The areas of use of an ethylene and propylene copolymer which cannot be sulfur crosslinked are electrical insulation, automotive applications, plastics modification, and electrical cable and connectors. Vistalon 404 is an Exxon Chemical America's trademark for a copolymer which is a 40±5% ethylene and propylene 60±5% product. A typical Exxon formulation using Vistalon 404 for use in the electrical insulation area includes peroxide coagent cure of 40% dicumyl peroxide and coagent TAC-75, a trade name product of Wyrough & Loser, which is a 75% dispersion of triallyl cyanurate. The formulation of the Exxon example have high water absorbency. Also, the composition favors conductivity while sacrificing processability and strength properties. The amount of antioxidant used is not large enough for elevated temperature protection. The TAC-75 coagent is not suitable for molds because it can cause sticking and premature vulcanization. The air brake diaphragms manufactured with Vistalon are generally fabric reinforced and smaller in size than a pipeline diaphragm. The elongation of about 230% is insufficient for a pulsation dampener which should be in the range of 400% to 600%.

The present invention is a superior copolymer composition which can withstand the degrading chemical environment and elevated temperatures longer than prior formulations for geothermal use that were also used for pipeline and pumping system parts. The present compound has performed in service with temperatures of at least 160° F. at 1000 psi in a gas line with a corrosion inhibitor without any recognizable deterioration. The ethylene and propylene copolymer exhibits superior thermal and hydrolytic stability qualities. The copolymer is crosslinked with carbon-carbon bonds between the polymer chains by using a peroxide to achieve the efficient crosslinking between the polymer chains.

The composition of the invention is a copolymer rubber which can be prepared with variable viscosity. The composition can be prepared with a range of viscosity suitable for transfer molding of products. Raising the ethylene percentage of the copolymer increases the viscosity and produces a harder rubber which could be used for compression molding for a product which needs less elasticity. Another significant advantage to the other ethylene propylene compositions is that it contains no process oils. Therefore, it can be used in transfer molding without the oil additives which harden or age by the process of volatilization or extraction of oil from the compound.

This invention provides a rubber for uses in accumulators such as diaphragms and seals which are subjected to degrading chemicals at elevated temperatures and pressures. This invention also provides, in one embodiment, a rubber composition using a low particle size carbon black which has unusual elasticity while serving in typically degrading chemical conditions.

The compound of this invention can be molded into the diaphragms and seals or any other rubber parts needed in certain pipeline applications requiring the chemical resistance exhibited by ethylene propylene copolymers. The useful life of the material exceeds prior reported compositions.

DESCRIPTION OF THE DRAWINGS

FIG. 1 is an perspect view of an example of a rubber diaphragm for an accumulator.

FIG. 2 is a cross-section of an accumulator in service with a pipeline.

DESCRIPTION OF PREFERRED EMBODIMENT

FIG. 1 is a diaphragm 10 used with Hydril Hydro-Pneumatic Accumulators Type I-P and is shown for exemplary purposes. The diaphragms can come in various sizes depending on the use and flow of the line and the shape may vary depending on the type of accumulator. FIG. 2 is a cross section of the Type I-P Accumulator 20 used in a pipeline shown for exemplary purposes to illustrate an embodiment of a diaphragm in use. This invention is for all types of diaphragms and other parts used in pipeline and pumping systems which are made of elastomeric compositions.

In FIG. 2, the housing 22 is generally hemispherical and is a sufficient wall thickness to endure high pressure. The housing encloses diaphragm 24 which is made of one of the examples of copolymer composition of this invention depending on the properties desired. The housing 22 has a charging valve 26 used to introduce an inert gas into the housing 22 and compress the diaphragm 24. In FIG. 2, the diaphragm 24 is in a compressed state. Diaphragm 10 in FIG. 1 is uncompressed and is generally an inverted, hollow conical structure with a mouth-like opening 12 at the narrowed end. This type of diaphragm has a metal plate insert 44 to prevent extrusion through the bottom flange connection. In FIG. 2, the lip 28 of the mouth of diaphragm 24 is held tightly in a groove 30 formed by housing 22 and bottom plate 32. The bottom plate 32 is a large plug with orifice 34 in the center. Plate 32 and housing 22 are secured to a neck 38 extending from the pipeline 36 by a series of studs. FIG. 2 shows studs 40 and 42 which hold the plate 32 and housing 22 on the neck 38 of the pipeline 36. The plate 32 fits inside the bottom of the housing and is fastened to the pipeline 36 such that the orifice 34 communicates through the opening of neck 38 with the pipeline 36 and the mouth of the diaphragm thereby providing the flow into the diaphragm when needed. Seal 42 is also shown which can be made of the rubber composition of this invention which requires less elasticity than diaphragm 24.

The illustrated accumulator is not intended to limit the invention to any type of pipeline or accumulator construction to practice this invention.

The copolymer for rubber parts of this invention is an ethylene and propylene type which is a peroxide curable rubber. There are various types and grades of ethylene and propylene copolymer. The percentage of ethylene is dependent on the product manufacturing method that will be used. The higher the ethylene content, the higher the viscosity of the composition before curing, and the harder and less elastic for the end product. For transfer molding which generally requires a viscosity ML of between 6 and 12, a copolymer of 40±5% ethylene and 60±5% propylene is suitable. Raising the ethylene content beyond 45% makes the uncured rubber too viscous for ordinary transfer molding, but compression molding or other alternative manufacturing processes could be used.

A preferred copolymer for use in the present invention for use with transfer molding is Vistalon 404 which is a broad molecular weight distribution copolymer which cannot be sulfur crosslinked. The copolymer has excellent thermal stability and can be used on normal rubber processing equipment. Typical raw polymer properties for Vistalon 404 are set forth in Table I below.

TABLE I

| | |
|---|---|
| Specific Gravity | 0.86 |
| Mooney Viscosity ML 1 + 8 212° F. | 35.45 |
| Vanadium Content | 50 ppm maximum |
| Ash | 0.1% by weight maximum |
| Volatiles | 0.5% |
| Diene Content | 0.0 |
| Typical Ethylene Content | 40% by weight |

Vistalon 404 is a copolymer which has been developed by Exxon Chemical Americas, designed specifically for electrical insulation and jacketing. The products have high heat resistance, good electrical properties, ozone and weather resistance, and excellent chemical resistance. There is no report in the available literature of the use of Vistalon 404 in drilling or geothermal type applications.

A synergistic system of antioxidants and a coagent produces an unusually stable copolymer when subjected to the extremes of geothermal type service. The synergistic system is composed of a sterically hindered phenol, salts of dithiocarbamate and a phenyleneimide. A preferred sterically hindered phenol is tetrakis [methylene 3-(3', 5'-di-tert-butyl-4'-hydroxyphenyl) proprionate] methane which is commercially available as an antioxidant Irganox 1010 a Ciba-Geigy product. The sterically hindered phenol antioxidant is from about 0.5 to about 8 parts per weight of copolymer in the initial mixture.

The other antioxidants of the system are metal salts of dithiocarbamate. The metal salts can be any of the following in effective amounts: Nickel dimethyl- dithiocarbamate, nickel di-isobutyldithiocarbamate, bismuth dimethyldithiocarbamate, cadmium diamyl- dithiocarbamate, cadmium diethyldithiocarbamate, copper dimethyl-dithiocarbamate, lead diamyldithiocarbamate, lead dimethyldithiocarbamate, selenium diethyldithiocarbamate, selenium dimethyldithiocarbamate, tellurium diethyldithiocarbamate, zinc diamyldithiocarbamate, zinc diethyldithiocarbamate, zinc dimethyldithiocarbamate, potassium dibutyldithiocarbamate, sodium dibutyl- dithiocarbamate, sodium cyclohexylethyldithiocarbamate, zinc dibenzyldithiocarbamate. Preferred metal salts of dithiocarbonate are nickel dimethyldithiocarbamate and nickel di-isobutyldithiocarbamate which are used in the composition from about 1 to about 3 parts per weight of copolymer. The amount of the two nickel dithiocarbamate antioxidants can be varied within the ranges stated independently of the other. The nickel antioxidants are available commercially as Methyl Niclate and Isobutyl Niclate tradename products sold by R. T. Vanderbilt. These compounds are recognized as antioxidants for products with peroxide crosslinking. The nickel salts are preferable because they do not accelerate vulcanization. The use of two nickel dithiocarbamates together increases the amount of dithiocarbamate in the compound because the solubility of one could be exceeded without achieving the desired level of dithiocarbamate in the composition for an effective level for the geothermal type conditions.

The other chemical in the synergistic system is a coagent. A preferred compound is N,N'-m-phenylene dimaleimide used in about 0.5 to 2.0 parts per weight of copolymer. This is commercially available under the trademark HVA-2, a DuPont product. The chemical apparently aids the rate and efficiency of peroxide crosslinking as well as being a thermal stabilizer. When HVA-2 is used with the antioxidants in the composition an unusual thermal stability is evidenced by the products manufactured with the composition.

Another feature of the composition is the use of various grades of carbon black. When ASTM D1765 N330 (Generic) and N990 carbon black, a Huber brand, are used in combination, they provide not only a reinforcement and toughening but also an antioxidant and thermal stability property that is unusual for carbon black. Other carbon blacks may be substituted for the N330 which are of a particle size smaller than N990. Where elasticity and chemical resistance are of primary consideration, a single black of very fine particle size may be used. A preferred carbon black is Black Pearls 1100 manufactured by Cabot Corporation. The absence of large particle black balances thermal stability in favor of elasticity. The rubber composition with the fine particle carbon black still exhibits good thermal stability up to at least 160° F. The properties of the carbon blacks are set forth in Table II below.

TABLE II

| Properties | Black Pearls 1100 | N330 | N990 |
|---|---|---|---|
| Particle size | 13–15 nm | 26–30 nm | 201–500 nm |
| DBP absorption No. | 50 | 102 | 40 |
| $I_2$ | 240 | 82 | — |

The N330 and N990 carbon blacks are used individually in about 25 to 100 parts per weight of copolymer. The amounts of the two grades of carbon blacks within the range stated are not mutually dependent, however a mixture of the two within the ranges is necessary to provide the unusual thermal stability. The Black Pearls are used in about 25 to 100 parts per weight of copolymer.

As previously discussed, the composition after curing contains carbon/carbon crosslinkage brought about by a peroxide curing agent which has been dispersed in an elastomer for safer and easier handling. A number of commercially available products could be used to produce the peroxide crosslinkage. The peroxide product used depends on the efficiency of crosslinkage desired. A preferred peroxide cure is E(VC)D-40 a Wyrough & Loser product which is 40% VUL-CUP R [a,a'bis(t-butylperoxy) diisopropylbenzene)] dispersed in 60% ethylene propylene rubber. VUL-CUP R is a Hercules product. The E(VC)D-40 is a very efficient peroxide to produce the cure state for the copolymer of the composition. The peroxide curing agent is used in about 6 to about 14 parts per weight of copolymer in the initial mixture.

In addition to the foregoing chemicals, other additives may be included. Various metallic oxides can be used in effective amounts as additional thermal stabilizers. The metallic oxides can be zinc oxide, magnesium oxide, cadmium oxide or oxides of lead. One of the metallic oxides selected for use in this invention is Zic Stik 85, a 90±2% zinc oxide in a proprietary binder marketed by Wyrough & Loser. Any number of other commercially available metallic oxides could be used. In this composition the metallic oxide is used in 0 to about 30 parts per weight of copolymer in the initial mixture.

Other additions such as process aids and lubricants can be used in effective quantities to produce the composition which can be handled, cured, and molded in a commercially feasible manner.

The composition is prepared in commercial internal mixing equipment which is cooled in the temperature range of about 55° F. during mixing to prevent premature curing of the copolymer prior to transfer to the desired molds. The copolymer and metallic oxide, if any is used, is mixed for about two minutes. For the composition using both the N330 and N990 blacks then about one-fourth of the N330 particle size carbon black and the sterically hindered phenol antioxidant is added and mixed for about one minute. Then the metal salts of dithiocarbamates are added with about an additional one-fourth of the N330 particle size carbon black and the coagent for about another minute. The next addition to the mixture is the remainder of the N330 particle size carbon black and processing aids may be added with mixing for one minute. Then the N990 carbon black is added. At the point of the addition of the N990 carbon black, about five minutes of mixing time has elapsed. The peroxide is added after the mixture is thoroughly combined, which is about two minutes after the addition of the N990 carbon black. The peroxide is mixed for about a minute. The times and duration of mixing periods are intended to be guidelines and can vary depending on the equipment used and amount of copolymer mixed. Also, the order in which the ingredients are added are not critical with the exception of the peroxide. The peroxide increases the heat of the mixture as it starts the cure and is usually added last to prevent premature curing. After the peroxide has been added the temperature of the composition should be approximately 190° F. to 200° F. and should not exceed 225° F.

After the composition is transferred to the mold of the desired product, the rubber is cured at a temperature from 300° to 360° F. At 310° F., the optimum time for curing is about one hour and fifteen minutes for a molded pipe protector. The time for curing goes down as the temperature is increased. There are other factors affecting the cure time and temperature which depend on the configuration of the molding apparatus used. For instance certain molds will necessitate a low temperature and longer time period to prevent overcuring. The molds are usually preheated to about 300° F. and are heated and put under about 500 psi to about 2000 psi pressure by a ram press during curing. The transfer molded products are usually cooled in ambient air after curing.

The cure time and temperature is also dependent on the peroxide cure of this composition. The peroxide is the active agent by extracting a hydrogen from a carbon hydrogen bond and creating a free radical on the carbon chain during curing. The carbon atom free radicals on the polymer chain form the backbone to backbone crosslinks. It is desired to use up all the highly active peroxide in the curing process and not have any excess peroxide left in the rubber. Since peroxide has a normal half life, the cure time can be calculated at a point when about 99% of the peroxide is broken down. The crosslinkage in curing is relative to the peroxide breakdown such that peroxide breakdown and cure time can be measured by normal rheometer tests in the laboratory and scale up for commercial applications.

The method for making a preferred composition of the invention which is suitable for commercially molded products is described and explained in the following example.

EXAMPLE 1

A conventional Banbury mixer for making rubber products was used. The mixer was set at 30 rpm and the ram was set at 50 psi. The water temperature of the jacket cooling the mixer is 55° F. 100 parts of Vistalon 404 with 10 parts per weight of Zic Stik 85 were mixed for about two minutes. Materials to be added are measured by parts per weight of the copolymer Vistalon 404 and include 4 parts Irganox 1010, 75 parts N330 carbon black, 25 parts N990 carbon black, 1 part T.E. 80 dlc, 0.5 parts HVA-2, 2 parts Methyl Niclate and 2 parts Isobutyl Niclate.

After about two minutes of mixing the Vistalon 404 and Zic Stik 85, 4 parts of Irganox 1010 is added with about one-fourth of the N330. About one minute later about one-fourth of the N330 is added with 0.5 parts HVA-2, 2 parts Methyl Niclate and 2 parts Isobutyl Niclate and mixed for about one minute. Then the balance of the N330 is added and 1 part T.E. 80 dlc is mixed for about one minute. Next 25 parts of N990 is added with the mixing continuing for about another two minutes. At this point about seven minutes of mixing time has elapsed. 11 parts of E(VC)D-40 is added and the temperature is approximately 180° F. The mixing continues for about one minute longer with the temperature of the mixture rising to about 190° F.–200° F. After milling preparation the mixture is ready for use in transfer molds.

The properties of this example of the composition cure as indicated are set forth in TABLE III below.

TABLE III

| | |
|---|---|
| ML ASTM D (2084) (at 300° F.) | 11 |
| MH ASTM D (2084) (at 300° F.) | 38 |
| Properties with 99% Cure Time at 300° F. (164 minutes) | |
| Tensile Strength ASTM D 412 | 1850 psi |
| $M_{100}$ | 745 psi |
| Elongation at Break (%) | 190 |
| Tear Strength ASTM D 624 (die C test) | 130 |
| Durometer Hardness ASTM D 2240 | 73 |
| Properties with 90% Cure (82 minutes) + 2 Hours in Oven at 400° F. | |
| Tensile Strength ASTM D 412 | 1825 psi |

TABLE III-continued

| | |
|---|---|
| $M_{100}$ | 625 psi |
| Elongation at Break (%) | 220 |
| Tear Strength ASTM D 624 (die C test) | 135 |
| Durometer Hardness ASTM D 2240 | 73 |

This rubber composition was tested for certain properties after being subjected to conditions which would include high heat and/or steam. Samples were placed in an autoclave at about 45 psi to 50 psi in steam at 290° F. The samples were in a water soluble drilling mud at 10 pounds per gallon. The samples were held for 10 days in this environment and tested for tensile strength and other properties. Table IV shows the results compared with the properties reported in Table III Properties with 99% Cure Time at 300° F.

TABLE IV

| | |
|---|---|
| Tensile Strength ASTM D 412 | No data |
| $M_{100}$ | +19% |
| Elongation at Break | −18% |
| Tear Strength ASTM D 624 (die C test) | +1% |
| Durometer Hardness ASTM D 2240 | +3 |

The samples of this embodiment were also subjected to dry air oven aging with no steam. The following results in Table V were also compared with the properties reported in Table III Properties with 99% Cure Time at 300° F.

TABLE V

Oven Drying at 392° F.

| | 24 hours | 48 hours |
|---|---|---|
| Tensile Strength ASTM D 412 | No data | No data |
| $M_{100}$ | +32% | 0% |
| Elongation at Break | −32% | −72% |
| Tear Strength ASTM D 624 (die C test) | +20% | +17% |
| Durometer Hardness ASTM D 2240 | +11 | +13 |

EXAMPLE 2

Using the equipment and procedures explained in Example 1 the following starting materials were mixed in parts per weight based on 93 parts of copolymer as shown in Table VI below.

TABLE VI

| STARTING MATERIAL | PARTS |
|---|---|
| Vistalon 404 | 93 |
| Irganox 1010 | 4 |
| Zic Stik 85 | 10 |
| Methyl Niclate | 2 |
| Isobutyl Niclate | 2 |
| HVA-2 | 0.5 |
| N990 | 50 |
| N330 | 70 |
| E(VC)D40 | 12 |

This formula gives a rubber with suitable viscosity for transfer molding. The properties are essentially the same as those reported for Example 1.

EXAMPLE 3

Using the equipment and procedures explained in Example 1 the following embodiment has a starting material copolymer of 55%±5% ethylene and 45%±5% propylene which gives a tougher rubber due to the higher ethylene content. The copolymer is commercially available under the trademark EPsyn 4006 by Copolymer Rubber & Chemical Corp. of Baton Rouge, La. The mixing ratio based on 93 parts of copolymer is in Table VII below.

TABLE VII

| STARTING MATERIAL | PARTS PER WEIGHT |
|---|---|
| EPsyn 4006 | 93 |
| Irganox 1010 | 4 |
| Methyl Niclate | 2 |
| Isobutyl Niclate | 2 |
| Zic Stik 85 | 10 |
| N990 | 50 |
| N330 | 50 |
| HVA-2 | 0.5 |
| E(VC)D40 | 12 |

The properties tested for this formulation are shown in Table VIII.

TABLE VIII

| Properties with 99% Cure Time at 320° F. (83 minutes) | |
|---|---|
| ML ASTM D (2084) | 21 |
| MH ASTM D (2084) | 136 |
| Tensile Strength ASTM D 412 | 1940 psi |
| $M_{50}$ | 405 psi |
| $M_{100}$ | 1025 psi |
| Elongation at Break (%) | 155 |
| Tear Strength ASTM D 624 (die C test) | 110 |
| Durometer | 75 |
| (Properties with 99% Cure Time at 340° F. (26.5 minutes)) | |
| ML ASTM D (2084) | 20 |
| MH ASTM D (2084) | 128 |
| Properties with Original Cure for 83 minutes at 320° F. and Post Cure in Oven 4 hours at 350° F. | |
| Tensile Strength ASTM D 412 | 2430 psi |
| $M_{50}$ | 480 psi |
| $M_{100}$ | 1185 psi |
| Elongation at Break (%) | 160 |
| Tear Strength ASTM D 624 (die C test) | 135 |
| Durometer Hardness ASTM D 2240 | 77 |

EXAMPLE 4

The following example uses a mixture of commercially available ethylene propylene copolymer to vary the ethylene content and properties of the rubber. The Vistalon 404 is mixed with Vistalon 707 which has a higher ethylene content, both Vistalon products are by Exxon Chemical Americas. The ingredients in Table IX are mixed as previously described in Example 1 and are based on 65 parts per weight of Vistalon 404.

TABLE IX

| STARTING MATERIAL | PARTS |
|---|---|
| Vistalon 404 | 65 |
| Vistalon 707 | 28 |
| Irganox 1010 | 4 |
| Methyl Niclate | 2 |
| Isobutyl Niclate | 2 |
| Zic Stik 85 | 10 |
| N330 | 50 |
| N990 | 50 |
| HVA-2 | 0.5 |
| E(VC)D40 | 12 |

The properties for this embodiment of rubber are shown in Table X.

TABLE X

| Properties with 99% Cure Time at 340° F. (25 minutes) | |
|---|---|
| ML ASTM D (2084) | 15 |
| MH ASTM D (2084) | 82 |
| Tensile Strength ASTM D 412 | 1725 psi |
| $M_{25}$ | 250 psi |
| $M_{50}$ | 360 psi |
| $M_{100}$ | 690 psi |

TABLE X-continued

| | |
|---|---|
| Elongation at Break (%) | 200 |
| Tear Strength ASTM D 624 (die C test) | 125 |
| Durometer ASTM D 2240 | 79 |
| Mooney Viscosity ASTM D 1646 at 275° F. | 54.00 points |
| $T_5$ (5 point increase in Mooney Viscosity number) | 4.45 minutes |
| $T_{35}$ (5 point increase in Mooney Viscosity number) | 6.85 minutes |
| Properties with 99% Cure Time at 340° F. (25 minutes) and Post Cure in Oven 4 hours at 350° F. | |
| Tensile Strength ASTM D 412 | 1780 psi |
| $M_{25}$ | 275 psi |
| $M_{50}$ | 385 psi |
| $M_{100}$ | 730 psi |
| Elongation at Break | 200% |
| Tear Strength ASTM D 624 (die C test) | 140 |
| Durometer ASTM D 2240 | 82 |

EXAMPLE 5

The following uses a very fine particle carbon black commerically available as Black Pearls 1100. The very fine black, not usually associated with rubber compounding, produces a very high elongation. The ingredients and starting materials in parts per weight based on 93 parts of copolymer are included in Table XI. The equipment previously described in Example 1 is used. The Vistalon 404 and about one half of the Black Pearls are mixed for 2 minutes. Then the Irganox 1010, balance of the Black Pearls, the methyl niclate and isobutyl niclate are added and mixed for 2 minutes. The Zic Stik 85 and HVA-2 are added and mixed. Then the E(VC) D40 is added and the temperature reaches approximately 180° F. The mixing continues until the temperature reaches 200°–210° F.

TABLE XI

| Starting Material | Parts |
|---|---|
| Vistalon 404 | 93 |
| Black Pearls 1100 | 75 |
| Irganox 1010 | 4 |
| Methyl Niclate | 2 |
| Isobutyl Niclate | 2 |
| Zic Stik 85 | 10 |
| HVA-2 | 0.5 |
| E(VC) D40 | 12 |

The properties for this embodiment of rubber are shown in Table XII. This embodiment has high elasticity properties.

TABLE XII

| | |
|---|---|
| ML ASTM D (2084) (at 340° F.) | 12 |
| MH ASTM D (2084) (at 300° F.) | 90 |
| Properties with 99% Cure Time at 340° F. (164 minutes) | |
| Tensile Strength ASTM D 412 | 3200 psi |
| $M_{100}$ | 545 psi |
| Elongation at Break (%) | 510 |
| Tear Strength ASTM D 624 (die C test) | 175 |
| Durometer Hardness ASTM D 2240 | 71 |
| Properties with 90% Cure (82 minutes) + 4 Hours at 350° F. | |
| Tensile Strength ASTM D 412 | 3600 psi |
| $M_{100}$ | 525 psi |
| Elongation at Break (%) | 570 |
| Tear Strength ASTM D 624 (die C test) | 210 |
| Durometer Hardness ASTM D 2240 | 75 |

The Example 5 was tested by Petrolite Oil Field Chemicals Group in Tretolite ® Kontrol ® KP-203, a corrosion inhibitor, which is injected with water in high temperature gas wells, Tretolite ® Kontrol ® KP-203 is a proprietary formula of Petrolite Corporation. Generally corrosion inhibitors include tertiary amines. The improved rubber compound was found to be resistant to chemical and heat degradation as a diaphragm. The compound, due to its unusually high elasticity for a peroxide cure, is suitable under the extreme conditions for pulsation dampeners. This high elasticity is accompanied by good elastic recovery, and is an unusual result for a peroxide cure. The Tretolite ® product is soluble in hydrocarbons and emulsifiable in water. Oil in water emulsions are generally degrading since oil resistant polymers are not generally water resistant at higher temperatures. It is believed that this composition will resist the emulsifiers and hydrocarbons in Tretolite ® corrosion inhibitor.

What is claimed is:

1. An elastic and chemical resistant rubber composition comprising a peroxide crosslinked ethylene propylene copolymer; an effective amount of metal salts of dithiocarbamate; an effective amount of sterically hindered phenol; minor effective amounts of coagent to peroxide crosslinking; and carbon black of a particle size of about 13 nm to about 15 nm used in about 25 to about 100 parts per weight of copolymer.

2. An elastic and chemical resistant rubber composition of claim 1 wherein said peroxide crosslinked ethylene propylene copolymer is comprised of about 35% to about 45% ethylene and about 55% to about 65% propylene.

3. An elastic and chemical resistant rubber composition of claim 1 wherein said metal salts of dithiocarbamate are chosen from a group consisting essentially of nickel dimethyl-dithiocarbamate, nickel di-isobutyl-dithio-carbamate, bismuth dimethyldithiocarbamate, cadmium diamyldithiocarbamate, cadmium diethyl-dithiocarbamate, copper dimethyldithiocar-bamate, lead diamyldithiocarbamate, lead dimethyldithiocarbamate, selenium diethyl- dithiocarbamate, selenium di-methyl-dithiocarbamate, tellurium diethyl-dithiocarbamate, zinc diamyldithiocarbamate, zinc diethyldithiocarbamate, zinc dimethyl- dithiocarbamate, potassium dibutyldithiocarbamate, sodium dibutyldithiocarbamate, sodium cyclohexylethyl dithiocarbamate, zinc dibenzyldithiocarbamate.

4. An elastic and chemical resistant rubber composition of claim 1 wherein said sterically hindered phenol is tetrakis [methylene 3-(3',5'-di-tert-butyl. 4'-hydroxyphenyl) propionate] methane.

5. An elastic and chemical resistant rubber composition of claim 1 wherein said coagent to peroxide crosslinking is N,N'-m-phenylene diamaleimide.

6. An elastic and chemical resistant rubber composition of claim 1 wherein said sterically hindered phenol is about 0.5 to about 8.0 parts per hundred weight of copolymer.

7. An elastic and chemical resistant rubber composition of claim 3 wherein said metal salts of dithiocarbamate are from about 1.0 to about 3.0 parts per hundred weight of copolymer.

8. An elastic and chemical resistant rubber composition of claim 1 wherein said coagent to crosslinking is about 0.5 to about 2.0 parts per hundred weight of copolymer.

9. An elastic and chemical resistant rubber composition of claim 1 including a metallic oxide.

10. An elastic and chemical resistant rubber composition of claim 9 wherein said metallic oxide is zinc oxide.

11. An elastic and chemical resistant rubber composition of claim 3 wherein said metal salts of diothiocarbamate are nickel dimethyldithiocarbamate in about 1.0 to about 3.0 parts per hundred weight of copolymer and nickel di-isobutyldithiocarbamate in about 1.0 to about 3.0 parts per hundred weight of copolymer.

12. An elastic and chemical resistant rubber composition of claim 1 including a lubricant process aid.

13. An accumulator diaphragm of the rubber composition of claim 1.

* * * * *